US010815411B2

(12) United States Patent
Newman et al.

(10) Patent No.: US 10,815,411 B2
(45) Date of Patent: *Oct. 27, 2020

(54) BENEFICIATING WEIGHTING AGENTS

(71) Applicant: Halliburton Energy Services, Inc., Houston, TX (US)

(72) Inventors: Katerina V. Newman, Houston, TX (US); Dale E. Jamison, Humble, TX (US); Earl Joseph Chauvin, Kingwood, TX (US); Yerzhan Ayapbergenov, Humble, TX (US); Brice Aaron Jackson, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 110 days.

This patent is subject to a terminal disclaimer.

(21) Appl. No.: 16/219,319

(22) Filed: Dec. 13, 2018

(65) Prior Publication Data

US 2019/0112515 A1   Apr. 18, 2019

Related U.S. Application Data

(62) Division of application No. 15/112,906, filed as application No. PCT/US2015/064189 on Dec. 7, 2015, now Pat. No. 10,167,419.

(51) Int. Cl.
*E21B 21/06* (2006.01)
*C09K 8/03* (2006.01)
(Continued)

(52) U.S. Cl.
CPC .............. *C09K 8/03* (2013.01); *B01D 21/262* (2013.01); *B03C 3/014* (2013.01); *B03C 3/017* (2013.01);
(Continued)

(58) Field of Classification Search
CPC ......... B07B 9/02; B03C 3/017; B03C 3/0175; B01D 21/262; E21B 21/063;
(Continued)

(56) References Cited

U.S. PATENT DOCUMENTS 5,132,025 A * 7/1992 Hays ..................... E21B 43/34
210/758
5,814,230 A 9/1998 Willis et al.
(Continued)

OTHER PUBLICATIONS

Bittner et al., Expanding Applications in DRy Triboelectric Separation of Minerals, IMPC 2014.
(Continued)

*Primary Examiner* — Joseph C Rodriguez
(74) *Attorney, Agent, or Firm* — Tenley Krueger; C. Tumey Law Group PLLC

(57) ABSTRACT

Beneficiating particulate additives by removing contaminants or minerals that impact the quality and specific gravity of the particulate additives may be achieved via dry solids separation technologies. For example, an air classifier, an electrostatic separator, and a combination thereof may be used to produce a beneficiated particulate additive comprising less than 40% of drill solids by weight of the beneficiated particulate additive.

20 Claims, 6 Drawing Sheets

(51) Int. Cl.

| | | |
|---|---|---|
| *B01D 21/26* | (2006.01) | |
| *B03C 3/014* | (2006.01) | |
| *B03C 3/017* | (2006.01) | |
| *B07B 7/083* | (2006.01) | |
| *B07B 9/02* | (2006.01) | |
| *C02F 1/38* | (2006.01) | |
| *B03C 3/47* | (2006.01) | |
| *C02F 103/10* | (2006.01) | |

(52) U.S. Cl.
CPC ............ *B07B 7/083* (2013.01); *B07B 9/02* (2013.01); *C02F 1/385* (2013.01); *E21B 21/065* (2013.01); *E21B 21/066* (2013.01); *B03C 3/47* (2013.01); *C02F 2103/10* (2013.01)

(58) Field of Classification Search
CPC ...... E21B 21/065; E21B 21/066; C02F 1/385; C02F 2103/10; C09K 8/03
See application file for complete search history.

(56) References Cited

U.S. PATENT DOCUMENTS

| | | | |
|---|---|---|---|
| 5,829,598 A | 11/1998 | Whitlock | |
| 5,904,253 A | 5/1999 | Cerullo et al. | |
| 5,944,195 A | 8/1999 | Huang et al. | |
| 5,961,438 A * | 10/1999 | Ballantine | B09B 1/00 |
| | | | 166/305.1 |
| 6,059,977 A | 5/2000 | Rowney et al. | |
| 6,150,498 A | 11/2000 | Abel, Jr. et al. | |
| 6,279,471 B1 | 8/2001 | Reddoch | |
| 6,320,148 B1 | 11/2001 | Yoon et al. | |
| 6,322,693 B1 | 11/2001 | Southall | |
| 6,530,438 B1 * | 3/2003 | McIntyre | B07B 1/06 |
| | | | 175/66 |
| 6,533,946 B2 | 3/2003 | Pullman | |
| 6,540,088 B2 | 4/2003 | Oder et al. | |
| 6,585,115 B1 | 7/2003 | Reddoch et al. | |
| 6,607,659 B2 * | 8/2003 | Hensley | E21B 21/065 |
| | | | 175/206 |
| RE38,367 E | 12/2003 | Southall | |
| 6,681,874 B2 | 1/2004 | Risher et al. | |
| 6,681,938 B1 | 1/2004 | Link et al. | |
| 6,820,829 B1 | 11/2004 | Oder et al. | |
| 7,124,968 B2 | 10/2006 | Oder et al. | |
| 7,337,860 B2 * | 3/2008 | McIntyre | E21B 21/065 |
| | | | 175/66 |
| 7,416,646 B2 | 8/2008 | Altman et al. | |
| 7,490,672 B2 * | 2/2009 | Hollier | E21B 21/065 |
| | | | 166/357 |
| 7,520,342 B2 | 4/2009 | Butler et al. | |
| 7,705,058 B2 * | 4/2010 | Coutinho | B01D 17/04 |
| | | | 516/194 |
| 7,947,628 B2 | 5/2011 | Oakley et al. | |
| 8,074,804 B2 | 12/2011 | Ramme et al. | |
| 8,132,632 B2 | 3/2012 | Scott | |
| 8,316,557 B2 * | 11/2012 | Burnett | F26B 7/00 |
| | | | 34/314 |
| 8,520,210 B2 | 8/2013 | Ramme et al. | |
| 8,552,326 B2 | 10/2013 | MacKay et al. | |
| 9,074,441 B2 * | 7/2015 | Addison | B65D 88/26 |
| 9,518,435 B2 | 12/2016 | Fout et al. | |
| 9,764,361 B2 * | 9/2017 | Valerio | B03B 9/061 |
| 10,167,419 B2 * | 1/2019 | Newman | C02F 1/385 |
| 2002/0014440 A1 | 2/2002 | Oder et al. | |
| 2003/0132140 A1 | 7/2003 | Oder et al. | |
| 2004/0016572 A1 | 1/2004 | Wylie et al. | |
| 2004/0069536 A1 | 4/2004 | Cowan | |
| 2004/0112996 A1 | 6/2004 | Villwock et al. | |
| 2004/0184974 A1 | 9/2004 | Altman et al. | |
| 2004/0217040 A1 | 11/2004 | Oder et al. | |
| 2005/0145732 A1 | 7/2005 | Oder et al. | |
| 2007/0235336 A1 | 10/2007 | Carrier et al. | |
| 2008/0083566 A1 | 4/2008 | Burnett | |
| 2008/0093072 A1 | 4/2008 | Oakley et al. | |
| 2011/0036576 A1 | 2/2011 | Kim et al. | |
| 2011/0289923 A1 | 12/2011 | Bittner et al. | |
| 2012/0050519 A1 | 3/2012 | Ramme et al. | |
| 2012/0059508 A1 | 3/2012 | MacKay et al. | |
| 2016/0060133 A1 * | 3/2016 | Vollmer | C02F 1/5236 |
| | | | 210/702 |
| 2018/0080295 A1 | 3/2018 | Newman et al. | |

OTHER PUBLICATIONS

ISR/WO received in corresponding PCT Application No. PCT/US2015/064189 dated May 13, 2016.

M.J. Pearse et al., "The Triboelectric Separation of Quartz-Calcite and Quartz-Apatite Powders after Chemical Conditioning," Powder Technology (1997).

USPTO Non-final Office Action for U.S. Appl. No. 15/112,906, dated Apr. 16, 2018.

\* cited by examiner

BENEFICIATING WEIGHTING AGENTS

BACKGROUND

The present application relates to recovering and beneficiating particulate additives like weighting agents.

As used herein, the term "particulate additives" refer to solids intentionally added to a wellbore fluid by an operator. Particulate additives typically have particle sizes below about 300 microns and, in some instances, below about 100 microns and, in some instances, below about 5 microns. As used herein, "drill solids" refer to formation solids added to the wellbore fluid as a result of drilling the wellbore, for example, particulates of the rock, clay, or other formation composition being drilled through.

Weighting agents are a common particulate additive added to wellbore fluids to change the specific gravity of the fluid. While drilling a well into a subterranean formation, the wellbore fluid suspends the drill solids, which are the small pieces of formation that break away from the formation due to the drilling. These drill solids have a lower specific gravity than the weighting agents and cause the specific gravity of the fluid to decrease. Therefore, separation techniques are employed to remove drill solids. For example, shale shakers, hydrocyclones, such as desanders and desilters, and centrifuges are used to remove the drill solids in a step-wise manner by removing particles the large particles first and sequentially smaller particles. However, many of the drill solids are about the same size as the particulate additives. Therefore, drill solids often remain in the wellbore fluid after implementing separation methods, which may adversely impact the specific gravity of the wellbore fluid, especially, when the wellbore fluid is reused or recirculated many times in a wellbore operation.

For example, drilling operations use a drilling fluid several times until the drilling fluid is unusable due to significant changes in drilling fluid properties caused by accumulation of fine and colloidal drill solids. At this stage, the drilling fluid is often referred to as a "spent drilling fluid." In some instances, a portion of the spent drilling fluid may be diluted and then further used. However, a significant portion of the spent drilling fluid is disposed of or processed to reclaim the continuous phase. The solids that remain after such processing are disposed of even though the solids contain significant amounts of reusable particulate additives like barite and calcium carbonate.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present application relates to improving the quality of particulate additives (that is, "beneficiating" the particulate additives) by removing contaminants or minerals that impact the quality and specific gravity of particulate additives. More specifically, the embodiments described herein employ dry solids separation technologies like air classification and electrostatic separation to beneficiate particulate additives after recovery from a wellbore fluid.

Exemplary particulate additives may include, but are not limited to, insoluble sulfates, silicates, aluminosilicates, oxides, carbonates, phosphates, or tungstates of barium, calcium, magnesium, strontium, titanium, tungsten, iron, aluminum, or zinc. As used herein, the term "insoluble" refers to a material or composition having a solubility less than 0.1 g/100 mL in a solvent.

Figure 1:
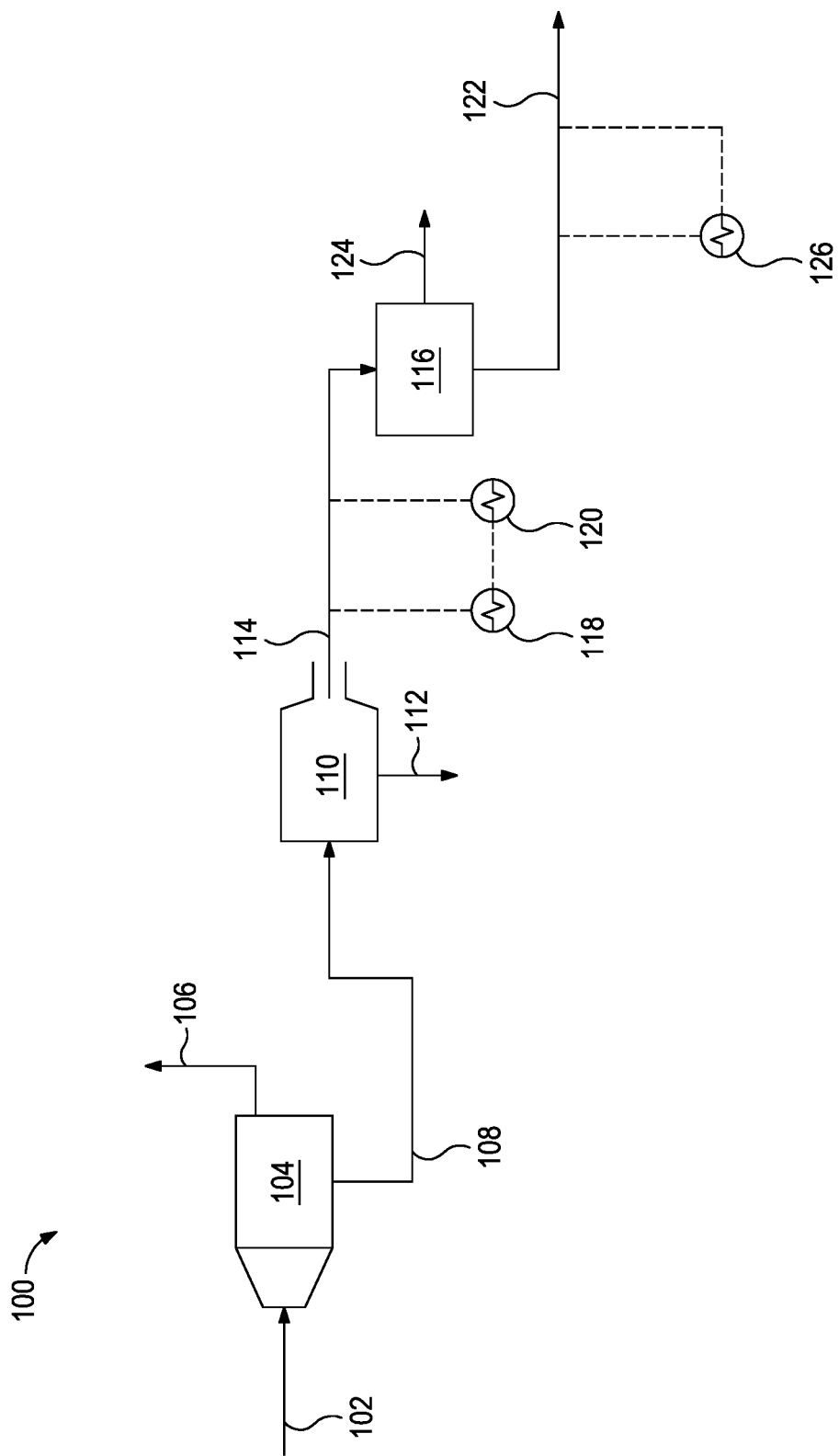
FIG. 1 provides an illustrative diagram of a separation system that may be used in conjunction with extracting and beneficiating particulate additives from oleaginous fluids.

FIG. 1 provides an illustrative diagram of a separation system 100 that may be used in conjunction with extracting and beneficiating particulate additives from an oleaginous fluid 102. The oleaginous fluid 102 may be a single-phase fluid (e.g., kerosene, mineral oil, diesel, or a combination thereof) or an invert emulsion (e.g., a water-in-oil emulsion).

The oleaginous fluid 102 is added to a centrifuge 104 where at least some of the fluids 106 are separated from the oleaginous fluid 102 to produce a slurry 108 having a high concentration of solids including the particulate additives and the drill solids. The oleaginous fluid 102 that is initially introduced into the separation system 100 may be a wellbore fluid or slurry' For example, a wellbore fluid may be a provided from a rig pit to the centrifuge 104 (e.g., as described in more detail in FIG. 5 below). In an alternative, off-shore embodiment, the wellbore fluid may be transported from an off-shore well site via a ship, a tanker, or the like, optionally stored, and then processed by the methods and separation systems (e.g., separation system 100) described herein.

The slurry 108 from the centrifuge 104 may then be treated in a liquid-solids separation system 110 that removes substantially all of the liquid 112 (e.g., oil and water) from the slurry 108 to yield dried particulates 114. As used herein, the term "dried" or "dry" refers to a composition (e.g., particulates) comprising fluid at less than about 31% by weight of the composition.

Exemplary liquid-solids separation system 110 may utilize techniques that include, but are not limited to, thermal desorption, solvent extraction, cryogenic drying, filter-drying, evaporator, crystallizer, concentrator, and any combination thereof.

The dried particulates 114 may then be separated by a dry solids separation system 116. In some embodiments, between the liquid-solids separation system 110 and the dry solids separation system 116, the dried particulates 114 may optionally be treated with a dryer and deagglomerator 118, a thermal treater 120, or both (in either order) as illustrated by the dashed lines to remove additional fluids from the dried particulates 114. The dryer and deagglomerator 118, the thermal treater 120, or both may be a portion of the system and optionally utilized to accommodate variations in the dried particulates 114 like moisture content, degree of aggregation, and the like' In some instances, the dryer and deagglomerator 118, which can heat the dried particulates 114 up to about 500° F. while agitating the dried particulates 114, may be useful to further reduce the amount of fluid (e.g., moisture) associated with the dried particulates 114 and separate any aggregated particulates. In some other instances, the thermal treater 120, which can heat the dried particulates 114 up to 2200° F., may also be used to further reduce the concentration of liquid in the dried particulates 114 and thermally degrade organic material like polymers or surfactants absorbed to the surface of the dried particulates 114 without decomposing the dried particulates 114.

In some instances, the dryer and deagglomerator 118 may be separate units.

The dry solids separation system 116 may include an air classifier, an electrostatic separator, or both, each of which are described in more detail herein. The dry solids separation system 116 may separate the dried particulates 114 into beneficiated particulate additives 122 and drill solids 124. Optionally, the beneficiated particulate additives 122 may optionally be further treated with a thermal treater 126 similar to the thermal treater 120 described above.

The beneficiated particulate additives 122, especially with the elevated specific gravity, may be reused as a particulate additive in another wellbore fluid at the well site in which the original wellbore fluid was used or at another well site. For example, the beneficiated particulate additives 122 may be transported to another well site and used in producing a wellbore fluid at that well site. In another example, the beneficiated particulate additives 122 may be recycled in the original wellbore fluid at the original well site, which is described further at FIG. 5.

Figure 2:
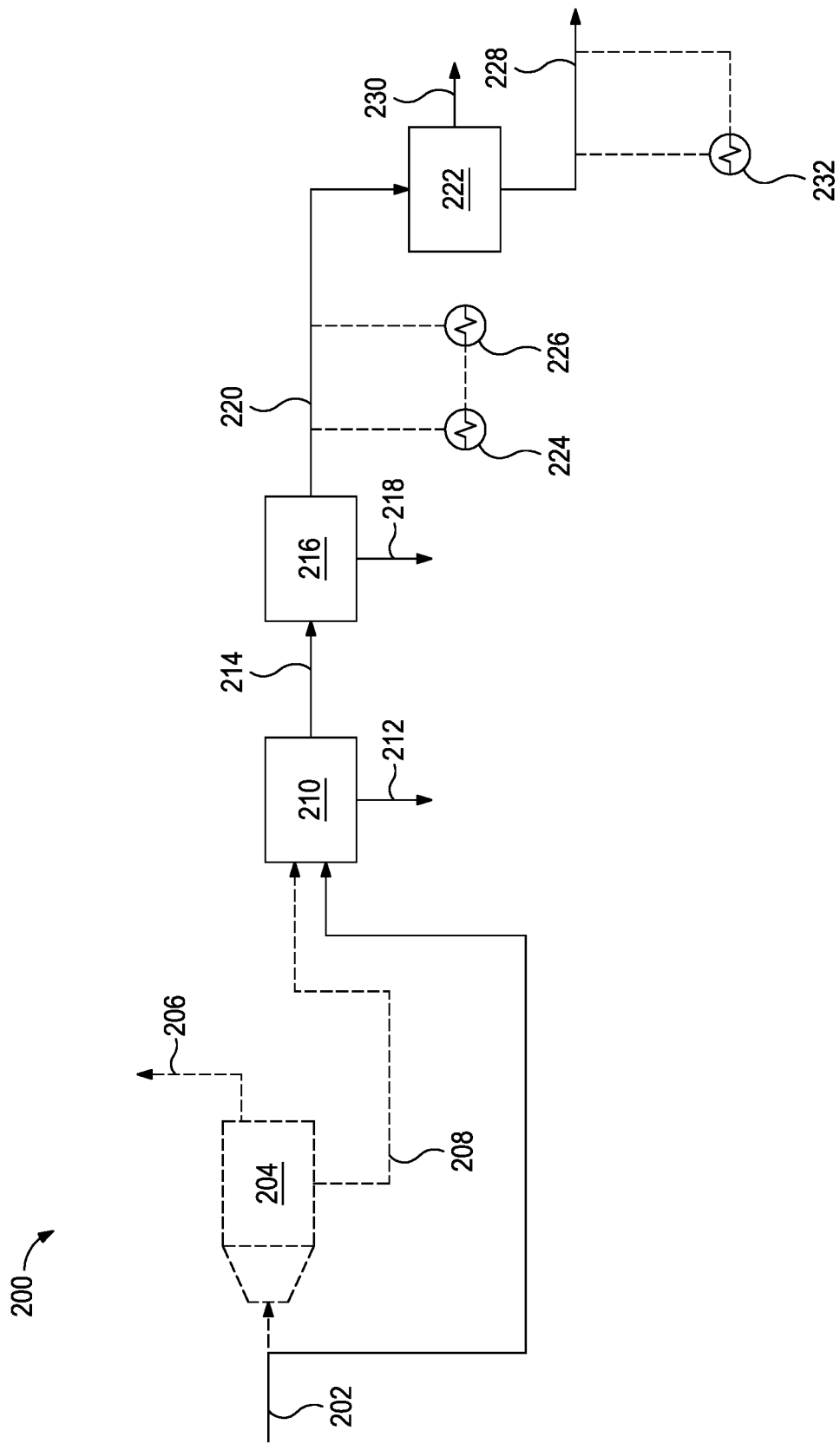
FIG. 2 provides an illustrative diagram of a separation system that may be used in conjunction with extracting and beneficiating particulate additives from aqueous fluids.

FIG. 2 provides an illustrative diagram of a separation system 200 that may be used in conjunction with extracting and beneficiating particulate additives from an aqueous fluid 202. The aqueous fluid 202 may be a single-phase fluid (e.g., a water, a brine, an aqueous-miscible fluid (e.g., polyols, alcohols, or amines), or a combination thereof) or an emulsion (e.g., an oil-in-water emulsion).

The aqueous fluid 202 may optionally be added to a centrifuge 204 where at least some of the fluids 206 are separated from the aqueous fluid 202 to produce a slurry 208 having a high concentration of solids including the particulate additives and the drill solids. The aqueous fluid 202 that is initially introduced into the separation system 200 may be a wellbore fluid or slurry. For example, a wellbore fluid may be a provided from a rig pit to the centrifuge 204 (e.g., as described in more detail in FIG. 5 below). In an alternative, off-shore embodiment, the wellbore fluid may be transported from an off-shore well site via a ship, a tanker, or the like, optionally stored, and then processed by the methods and separation systems (e.g., separation system 200) described herein.

The slurry 208 from the centrifuge 204 (or the aqueous fluid 202 when a centrifuge is not used) may be dewatered with a liquid solids separation system 210 (e.g., a evaporator, crystallizer, concentrator, or a combination thereof) to remove liquid 212 and yield a slurry 214. The slurry 214 may then be further treated with an apparatus 216 that uses sedimentation, incline plate separation, or filtration to remove a substantial amount of liquid 218 from the slurry 214 and produce dried particulates 220.

The dried particulates 220 may then be separated by a dry solids separation system 222 (e.g., similar to the dry solids separation system 116 of FIG. 1) to yield beneficiated particulate additives 228 and drill solids 230. In some embodiments, between the apparatus 216 and the dry solids separation system 222, the dried particulates 220 may optionally be treated with a dryer and deagglomerator 224, a thermal treater 226, or both as illustrated by the dashed lines to remove additional fluids from the dried particulates 220 as described in FIG. 1 for the dried particulates 114. Further, in some instances, a thermal treater 232 may optionally be used to treat the beneficiated particulate additives 228.

The beneficiated particulate additives 228 may then be used as described relative to the beneficiated particulate additives 122 of FIG. 1.

In both of the foregoing example, the beneficiated particulate additives 122,228 may be used in a wellbore fluid that is different than the original wellbore fluid. For example, the system 200 of FIG. 2 may be used to produce beneficiated particulate additives 228 from the aqueous fluid 202. Then, the beneficiated particulate additives 228 may be used for producing an oleaginous fluid at the well site or elsewhere.

When implementing the foregoing separation systems 100,200, in some instances, the beneficiated particulate additives 122,228 may contain less than 40% drill solids 124,230 by weight of the beneficiated particulate additives 122,228, less than 30% by weight, less than 20% by weight, less than 10% by weight, or less than 3% by weight. This increases the specific gravity (SG) of the beneficiated particulate additives 122,228 relative to the dried particulates 114,220. By way of nonlimiting example, the particulate additives in the fluid 102,202 may be barite, which has a specific gravity (SG) of 4.4. In such an example, the dried particulates 114,220 may have an SG of about 3.2 to about 4.0 while the beneficiated particulate additives 122,228 may have a specific gravity of about 3.7 to about 4.4. This example may be extended to other particulate additives with other specific gravities (e.g., iron oxide with an SG of 4.8-5.3, ilmenite with an SG of 4.7-4.8, or galena with an SG of 7.2-7.6). In some instances, the specific gravity of the beneficiated particulate additives 122,228 may be at least 0.05 SG units greater than the specific gravity of the dried particulates 114,220 (e.g., about 0.05 SG units greater up to the specific gravity of the particulate additives), or more preferably at least 0.2 SG units greater.

Figure 3:
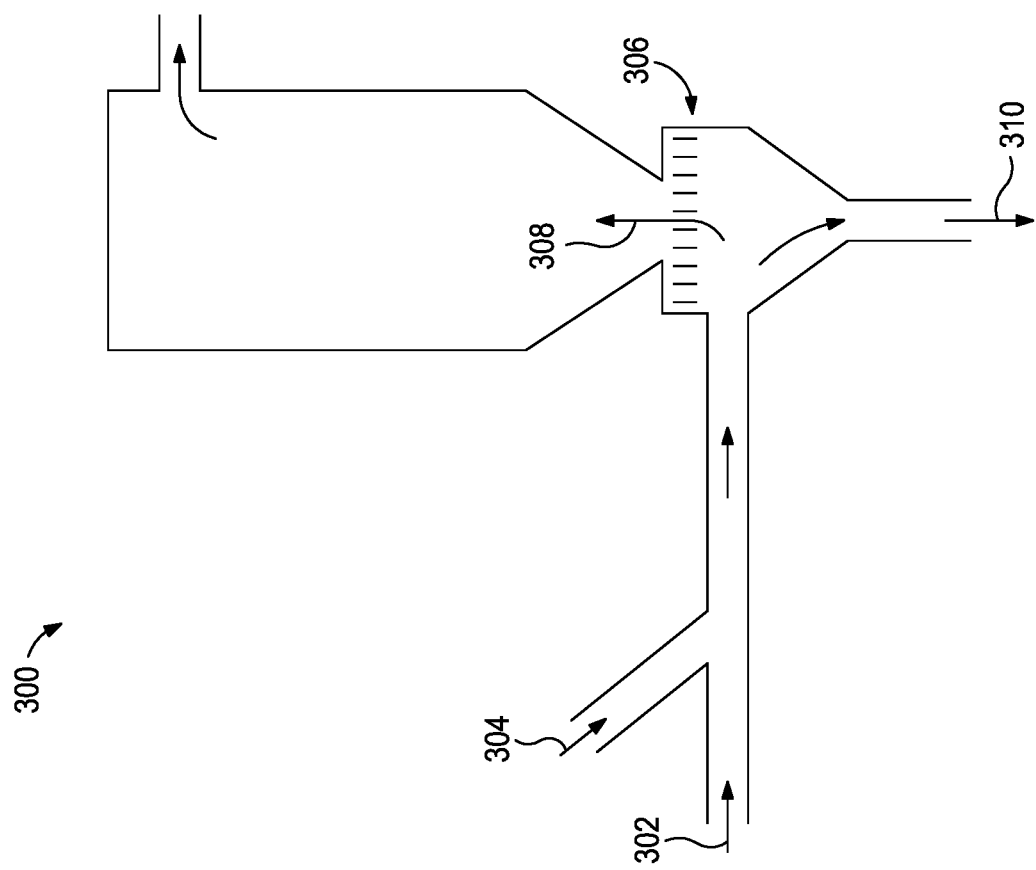
FIG. 3 provides an illustrative diagram of a portion of an exemplary air classifier.

FIG. 3 provides an illustrative diagram of a portion of an exemplary air classifier 300. Other air classifier designs may be implemented in the systems and methods of the present disclosure. Air flow 302 conveys particulates 304 (e.g., a mixture of fine and course particulates 308,310) to a classifying wheel 306. The particulates 304 impinge or pass through the spinning classifying wheel 306 in the centripetal direction. In some instances, the classifying wheel 306 may include a series of blades that are repositionable to provide for a desired opening size between blades. Further, the speed of the classifying wheel 306 may be adjusted to control the size of particulates that pass therethrough.

Fine particulates 308 may be conveyed via the air flow through the classifying wheel 306 while course particulates 310 may be rejected by the classifying wheel 306. The course particulates 310 may then be conveyed via the air flow to another portion of the air classifier 300 and collected.

In some instances, particulate additives may be intermediately sized particulates between naturally softer fines (e.g., calcite) and harder fines (e.g., sand and dolomite). The relative concentration of each of these drill solids will depend on the composition of the formation being drilled. In some instances, low concentrations of either drill solids may allow for the dry solids separation systems 116,222 of FIGS. 1 and 2 to include at least one air classifier 300. In alternative instances, the dry solids separation systems 116,222 of FIGS. 1 and 2 may include at least two air classifiers to separate the three sets of particulates (i.e., the smaller fines, the particulate additive, and the course fines).

The air flow in the air classifier 300 may advantageously cause for the particulates 304 to contact each other and the sides of the air classifier 300 so as to break up agglomerates of the particulates 304. This allows for greater efficacy in separating the constituents of the particulates 304 because, in many instances, the smaller, softer fines tend to agglomerate. This may be especially problematic when working with wellbore fluids because the chemical additives like salts, viscosifiers, corrosion inhibitors, and the like enhance agglomeration of the particulates 304.

Figure 4:
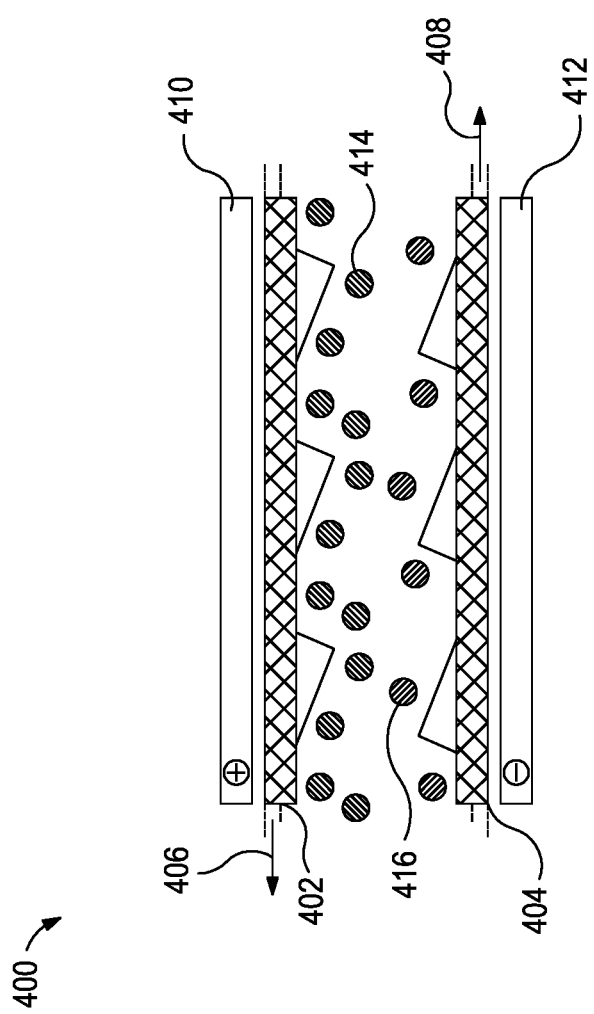
FIG. 4 provides an illustrative diagram of a portion of an electrostatic separator.

FIG. 4 provides an illustrative diagram of a portion of a electrostatic separator 400. The electrostatic separator 400 includes two surfaces 402,404 that are associated with electrodes 410,412 that have opposite charges. In some instances, the surfaces 402,404 may be the surface of the electrodes 410,412. The surfaces 402,404 run in parallel but in opposite directions as indicated by arrows 406,408, respectively. As illustrated, the bottom surface 404 moves to the right and is associated with a negative electrode 412 while the top surface 402 moves to the left and is associated with a positive electrode 410. During operation, the electrodes 410,412 charge the particulates 414,416, attract and/or repel the particulates 414,416 based on the charge, and move the particulates away via the moving surfaces 402, 404. In some instances, the particulates 414,416 may become oppositely charged where, for example, the particulates 414 are negatively charged and attracted to the positive electrode 410, and the particulates 416 are positively charged and attracted to the negative electrode 412. In alternative embodiments, the particulates 414,416 may become charged positively or negatively but to different degrees based on the electrostatic potential of the particulates 414,416. Accordingly, the degree to which the particulates 414,416 are attracted to the positive or negative electrodes 410,412 may aid in separating the particulates 414, 416.

The electrostatic potential of particulate additives and drill solids, and therefore their electrostatic charges in the electrostatic separator 400, may be further modified or altered by chemical additives in the wellbore fluid. Chemical additives with different electronegative values may be used either in the wellbore fluid or after drying the particulates and before using the electrostatic separator 400 to change the electrostatic potential of one or both of the particulates 414,416 and, therefore, affect results of electrostatic separation. Chemical additives that may be used in the wellbore fluid or after drying the particulates to effect the electrostatic potential of one or both of the particulates 414,416 may include, but are not limited to, phosphate esters, sarcosines, sarcosinates, alkyl aryl sulphonates, sulfosuccinates, taurates, fatty acid esters, sorbitan Stearates, stearyl stearates, sodium lactylates, dimers (e.g., dimer acids, dimer diols, dimer diamines), polyols, polymerized fatty acids, surfactants (e.g., cocamidipropyl surfactants and cocoamphodiacetate), imidazolines, fatty amines, ethoxylated fatty acids, alcohol ethoxylates, polymeric esters, block copolymers (e.g., alkoxylated ethylene diamine), acrylic copolymers, styrene copolymers, polyol alkoxylate esters, resins, and the like, and any combination thereof. In some instances, water may be used to change the moisture content and relative humidity of the particulates 414,416 before electrostatic separation where the degree to which each of the particulates 414,416 absorbs water to its surface enhances the separation thereof.

The wellbore fluids (e.g., fluids 102,202 of FIGS. 1 and 2) may optionally include additives like dispersants and viscosifiers that coat at least a portion of the surface of the particulates in the fluid. In some instances, the coating on the surface of the particulates (e.g., the particulate additive particulates or the drill solids) may alter the charge of the particulate during electrostatic separation.

The configuration of the dry solids separation systems described herein (e.g., the use of (a) one or more air classifiers, (b) one or more electrostatic separators, or (c) one or more air classifiers in combination with one or more electrostatic separators) may depend on the composition of the formation being drilled.

Figure 5:
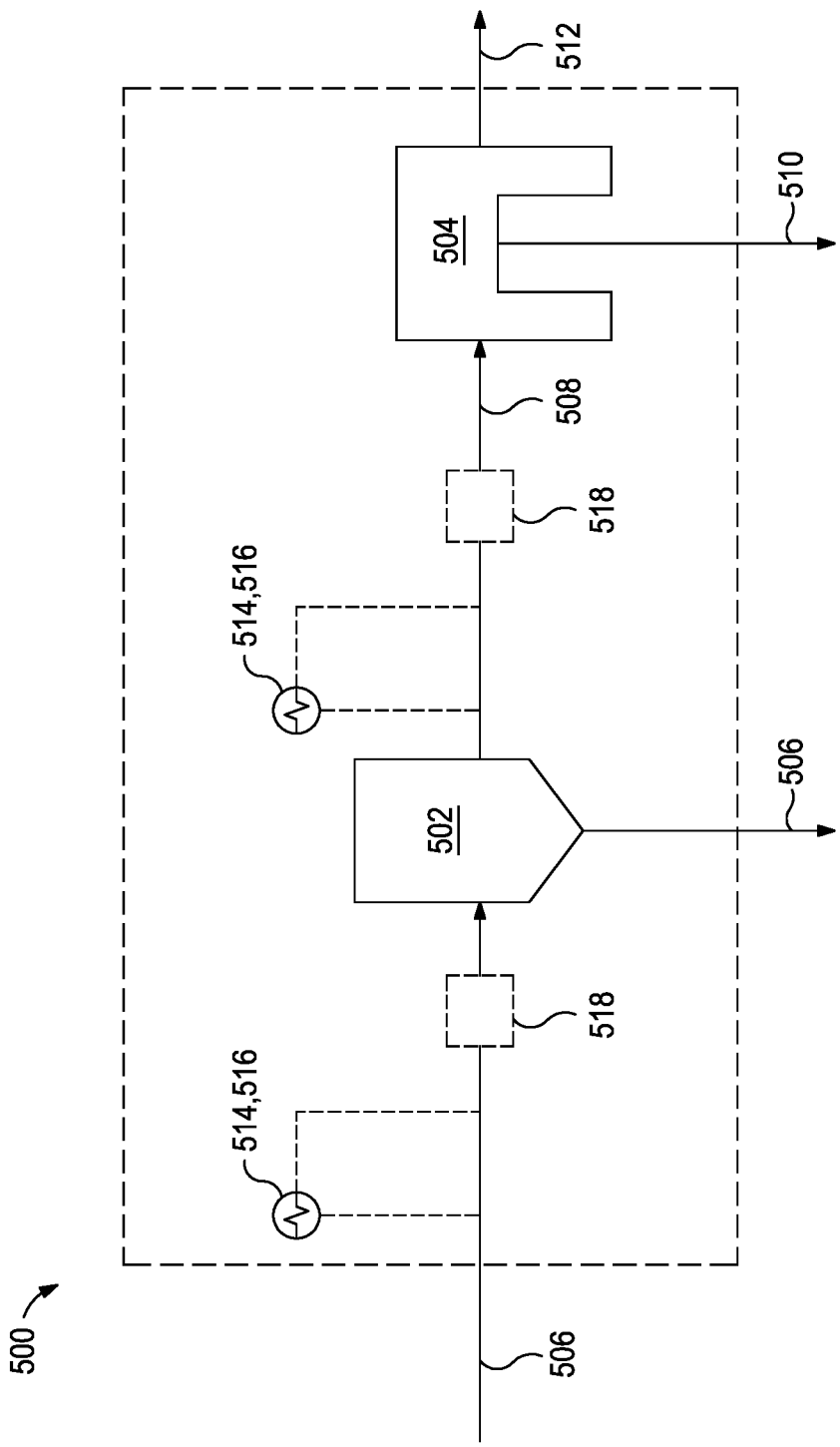
FIG. 5 provides an illustrative diagram of a dry solids separation system that includes an air classifier and an electrostatic separator in series.

FIG. 5 provides an illustrative diagram of a dry solids separation system 500 that includes an air classifier 502 and a electrostatic separator 504 in series. Dried particulates 506 are first introduced to the air classifier 502, which may separate course particulates 506 from smaller particulates 508. The smaller particulates 508 may include drill solids 510 and particulate additives 512. The smaller particulates 508 may then be treated with the electrostatic separator 506 to separate the drill solids 510 and the particulate additives 512 based on charge.

In some instances, the dry solids separation system 500 may optionally further include a dryer and deagglomerator 514 and/or a thermal treater 516 before the air classifier 502 and/or between the air classifier 502 and the electrostatic separator 504.

In some instances, the dry solids separation system 500 may optionally further include a chemical treatment apparatus 508 before the air classifier 502 and/or between the air classifier 502 and the electrostatic separator 504. The chemical treatment apparatus 508 may be useful in changing the surface charge of some or more of the particles treated thereby.

In an alternative embodiment to the illustrated dry solids separation system 500, a dry solids separation system may include two air classifiers in series followed by a electrostatic separator. This configuration may be useful when the dried particulate introduced into the dry solids separation system include intermediately sized particulate additives and drill solids across the size spectrum where the intermediately sized drill solids are charged differently than the particulate additives. In another alternative embodiment, a dry solids separation system may include a electrostatic separator upstream of one more air classifiers. Again, a dryer and deagglomerator, a thermal treater, a chemical treatment apparatus, or a combination thereof may be included at one or more locations within the dry solids separation system.

Figure 6:
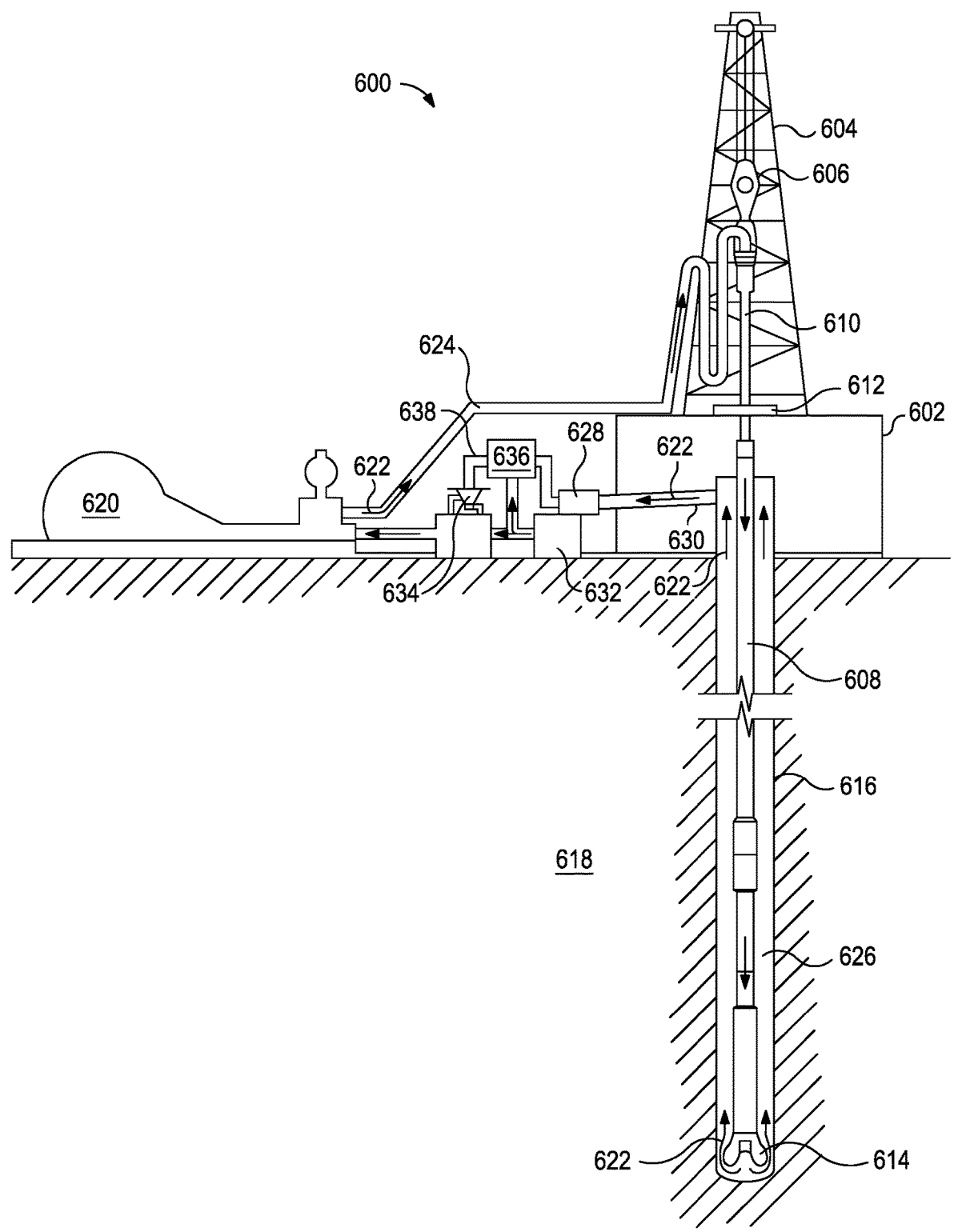
FIG. 6 provides an illustrative diagram of an exemplary wellbore drilling assembly.

FIG. 6 provides an illustrative diagram of an exemplary wellbore drilling assembly 600, according to one or more embodiments. It should be noted that while FIG. 6 generally depicts a land-based drilling assembly, those skilled in the art will readily recognize that the principles described herein are equally applicable to offshore drilling operations that employ floating or sea-based platforms and rigs, without departing from the scope of the disclosure.

As illustrated, the drilling assembly 600 may include a drilling platform 602 that supports a derrick 604 having a traveling block 606 for raising and lowering a drill string 608. The drill string 608 may include, but is not limited to, drill pipe and coiled tubing, as generally known to those skilled in the art. A kelly 610 supports the drill string 608 as it is lowered through a rotary table 612. A drill bit 614 is attached to the distal end of the drill string 608 and is driven either by a downhole motor and/or via rotation of the drill string 608 from the well surface. As the bit 614 rotates, it creates a borehole 616 that penetrates various subterranean formations 618.

A pump 620 (e.g., a mud pump) circulates wellbore fluid 622 through a feed pipe 624 and to the kelly 610, which conveys the wellbore fluid 622 downhole through the interior of the drill string 608 and through one or more orifices in the drill bit 614, The wellbore fluid 622 is then circulated back to the surface via an annulus 626 defined between the drill string 608 and the walls of the borehole 616. At the surface, the recirculated or spent wellbore fluid 622 exits the annulus 626 and may be conveyed to one or more fluid processing unit(s) 628 via an interconnecting flow line 630. While illustrated as being arranged at the outlet of the wellbore 616 via the annulus 626, those skilled in the art will readily appreciate that the fluid processing unit(s) 628 may be arranged at any other location in the drilling assembly 600 to facilitate its proper function, without departing from the scope of the scope of the disclosure.

After passing through the fluid processing unit(s) 628, a "cleaned" wellbore fluid 622 may then be deposited into a nearby retention pit 632 (i.e., a mud pit). Optionally, a portion of the "cleaned" wellbore fluid 622 may also be diverted to a separation system 636 (e.g., like the separation system 100 of FIG. 1). In some instances, the fluid processing unit(s) 628 may contain some of the components of the separation system 636 like the centrifuge. Additionally, the fluid from the retention pit may be recirculated back into the wellbore 616. In some instance, a portion of the fluid from the retention pit may be passed through the separation system 636.

One or more of the disclosed particulate additives or beneficiated particulate additives may be added to the wellbore fluid 622 via a mixing hopper 634 communicably coupled to or otherwise in fluid communication with the retention pit 632 and/or the fluid from the retention pit 632 being recirculated into the wellbore 616. For example, as illustrated, feed pipe 636 extending from the separation system 636 to the mixing hopper 634 may be used to provide beneficiated particulate additive (e.g., beneficiated particulate additive 122 of FIG. 1) from the separation system 636 to the mixing hopper 634.

The mixing hopper 634 may include, but is not limited to, mixers and related mixing equipment known to those skilled in the art. In other embodiments, however, the disclosed particulate additives or beneficiated particulate additives may be added to the wellbore fluid 622 at any other location in the drilling assembly 600. In at least one embodiment, for example, there could be more than one retention pit 632, such as multiple retention pits 632 in series. Moreover, the retention pit 632 may be representative of one or more fluid storage facilities and/or units where the disclosed particulate additives or beneficiated particulate additives may be stored, reconditioned, and/or regulated until added to the wellbore fluid 622.

Exemplary components of the fluid processing unit(s) 628 may include, but are not limited to, one or more of a shaker (e.g., shale shaker), a centrifuge, a hydrocyclone, a separator (including magnetic and electrical separators), a desilter, a desander, a Separator, a filter (e.g., diatomaceous earth filters), a heat exchanger, any fluid reclamation equipment, and the like. The fluid processing unit(s) 628 and/or the separation system 636 may further include one or more sensors, gauges, pumps, compressors, and the like used store, monitor, regulate, and/or recondition the exemplary particulate additives or beneficiated particulate additives described herein.

Embodiments described herein include, but are not limited to, Embodiments A, B, and C.

Embodiment A is a method that comprises: centrifuging a wellbore fluid to produce a slurry, the wellbore fluid (e.g., a drilling fluid) comprising an oleaginous fluid (e.g., an invert emulsion), a particulate additives, and a drill solid; removing the oleaginous fluid from the slurry to produce dried particulates; separating the dried particulates with a dry solids separation system that comprises one selected from the group consisting of an air classifier, an electrostatic separator, and a combination thereof to produce a beneficiated particulate additive comprising less than 40% of drill solids by weight of the beneficiated particulate additive, and wherein the specific gravity of the dried particulates is less than the specific gravity of the beneficiated particulate additive.

Embodiment B is a method that comprises: treating a wellbore fluid (e.g., a drilling fluid) that comprises an aqueous fluid, a particulate additive and a drill solid, by removing the aqueous fluid to produce dried particulates; treating the dried particulates with a dry solids separation system that comprises one selected from the group consisting of an air classifier, an electrostatic separator, and a combination thereof to produce a beneficiated particulate additive comprising less than 40% of drill solids by weight of the beneficiated particulate additive, and wherein the specific gravity of the dried particulates is less than the specific gravity of the beneficiated particulate additive. Embodiment B may optionally further comprise: centrifuging the wellbore fluid to produce a slurry before producing the dried particulates.

Embodiment C is a system that comprises: a tubular (e.g., a drill string with a drill bit at the distal end) extending into a wellbore penetrating a subterranean formation; a first flow line fluidly coupling the wellbore to a retention pit; a second flow line fluidly coupling the retention pit to a pump; a third flow line fluidly coupling the pump to the tubular; a separation system fluidly coupled at least one selected from the group consisting of the retention pit, the first flow line, and the second flow line, wherein the separation system comprises a liquid-solids separation system upstream of a dry powder separation system; and the pump configured to circulate a wellbore fluid through the tubular, the first flow line, the second flow line, the third flow line, and the retention pit.

Embodiments A and B may optionally include one or more of the following: Element 1: wherein the beneficiated particulate additive has less than 10% of the drill solids by weight of the beneficiated particulate additive; Element 2: wherein the air classifier is a first air classifier, and wherein the dry solids separation system comprises the first air classifier and a second air classifier in series; Element 3: wherein the dry solids separation system comprises one air classifier and one electrostatic separator, and wherein the one air classifier is upstream of the one electrostatic separator; Element 4: wherein the dry solids separation system comprises one air classifier and one electrostatic separator, and wherein the one air classifier is downstream of the one electrostatic separator; Element 5: the method further comprising deagglomerating the dried particulates before separating the dried particulates (or treating the dried particulates with a dry solids separation system); Element 6: the method further comprising heating the dried particulates to a temperature sufficient to reduce an amount of the oleaginous fluid before separating the dried particulates (or treating the dried particulates with a dry solids separation system); Element 7: the method further comprising heating the beneficiated dried particulates to a temperature sufficient to reduce an amount of the oleaginous fluid after separating the dried particulates (or treating the dried particulates with a dry solids separation system); Element B: wherein the wellbore fluid is a first wellbore fluid and the method further comprises formulating a second wellbore fluid with the beneficiated particulate additive; Element 9: wherein the wellbore fluid is a first wellbore fluid, the wellbore is at a first well site, and the method further comprises transporting the beneficiated particulate additive to a second well site; and formulating a second wellbore fluid at the second well site with the beneficiated particulate additive; and Element 10: drilling a wellbore penetrating a subterranean formation with the wellbore fluid. Exemplary combinations may include, but are not limited to, one or more of Elements 5-9 in combination with one of Element 2-4 and optionally in further combination with Element 1; Element 1 in combination with one of Element 2-4; Element 1 in combination with one or more of Elements 5-9; two or more of Elements 5-9 in combination; Element 10 in combination with any of the foregoing; and Element 10 in combination with one or more of Elements 1-9.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

While compositions and methods are described herein in terms of "comprising" various components or Steps, the compositions and methods can also "consist essentially of" or "consist of" the various components and steps.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or Steps, the compositions and methods can also "consist essentially of" or "consist of" the various components and steps. All numbers and ranges disclosed above may vary by some amount. Whenever a numerical range with a lower limit and an upper limit is disclosed, any number and any included range failing within the range is specifically disclosed. In particular, every range of values (of the form, "from about a to about b," or, equivalently, "from approximately a to b," Or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
   treating a wellbore fluid that comprises an aqueous fluid, a particulate additive, and a drill solid by removing the aqueous fluid to produce a dried particulate composition comprising the particulate additive and the drill solid;
   introducing the dried particulate composition into a dry solids separation system that comprises an air classifier and an electrostatic separator in series; and
   separating a quantity of the drill solid from the dried particulate composition thereby producing a beneficiated particulate additive, wherein a first portion of drill solid is separated via the air classifier and a second portion of drill solid is separated via the electrostatic separator;
   wherein the separating with the dry solids separation system that comprises the air classifier and the electrostatic separator in series results in the beneficiated particulate additive:
   i) comprising less than 40% of drill solids by weight of the beneficiated particulate additive, and
   ii) having a specific gravity greater than the specific gravity of the dried particulate composition.

2. The method of claim 1 further comprising:
   centrifuging the wellbore fluid to produce a slurry before producing the dried particulate composition.

3. The method of claim 1, wherein the beneficiated particulate additive has less than 10% of the drill solids by weight of the beneficiated particulate additive.

4. The method of claim 1, wherein the air classifier is a first air classifier, and wherein the dry solids separation system comprises the first air classifier and a second air classifier in series.

5. The method of claim 1, wherein the dry solids separation system comprises one air classifier and one electrostatic separator, and wherein the one air classifier is upstream of the one electrostatic separator.

6. The method of claim 1 further comprising:
   deagglomerating the dried particulate composition before the step of separating.

7. The method of claim 1
   wherein the dried particulate composition further comprises an oleaginous fluid and wherein the method further comprises heating the dried particulate composition to a temperature sufficient to reduce an amount of the oleaginous fluid before treating the dried particulates composition with the dry solids separation system.

8. The method of claim 1, wherein the wellbore fluid is a first wellbore fluid and the method further comprises:
producing a second wellbore fluid with the beneficiated particulate additive.

9. The method of claim 1, wherein the wellbore fluid comprises an emulsion.

10. The method of claim 1, wherein the wellbore fluid further comprises a polyol, an alcohol, an amine, or combinations thereof.

11. The method of claim 1, wherein the step of removing the aqueous fluid comprises at least one of thermal desorption, solvent extraction, cryogenic drying, filter-drying, evaporation, crystallization, concentration, or combinations thereof.

12. The method of claim 1, wherein the step of treating the wellbore fluid further comprises sedimentation, incline plate separation, or filtration to produce the dried particulate composition.

13. The method of claim 1, further comprising heating the dried particulate composition in a thermal treater.

14. The method of claim 1, further comprising heating the beneficiated particulate additive in a thermal treater.

15. The method of claim 1, wherein the beneficiated particulate additive has a specific gravity of at least 0.05 specific gravity units greater than the dried particulate composition.

16. A method comprising:
dewatering a wellbore fluid comprising an emulsion of oil and water, a particulate additive, and a drill solid in a liquid solids separation system to produce a slurry comprising a majority of the particulate additive and the drill solid;
treating the slurry by at least one of sedimentation, incline plate separation, or filtration to produce a dried particulate composition;
introducing the dried particulate composition into a dry solids separation system that comprises an air classifier and an electrostatic separator in series,
separating a quantity of the drill solid from the dried particulates thereby producing a beneficiated particulate additive, wherein a first portion of drill solid is separated via the air classifier and a second portion of drill solid is separated via the electrostatic separator;
wherein the separating the dry solids separation system that comprises the air classifier and the electrostatic separator in series results in a beneficiated particulate additive:
i) comprising less than 40% of drill solids by weight of the beneficiated particulate additive, and
ii) having a specific gravity greater than the specific gravity of the dried particulate composition.

17. The method of claim 16 further comprising centrifuging the wellbore fluid prior to dewatering the wellbore fluid.

18. The method of claim 16, further comprising introducing the dried particulate composition into a dryer and deagglomerator.

19. The method of claim 16, further comprising heating the dried particulate composition in a thermal treater.

20. The method of claim 16, further comprising heating the beneficiated particulate additive in a thermal treater.

* * * * *